(12) United States Patent
Yoda (10) Patent No.: US 7,991,266 B2
(45) Date of Patent: Aug. 2, 2011

(54) REPRESENTATIVE IMAGE PROVIDING SYSTEM AND REPRESENTATIVE IMAGE PROVIDING METHOD

(75) Inventor: Akira Yoda, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1874 days.

(21) Appl. No.: 11/106,534

(22) Filed: Apr. 15, 2005

(65) Prior Publication Data

US 2006/0166823 A1    Jul. 27, 2006

(30) Foreign Application Priority Data

Apr. 15, 2004  (JP) ................. 2004-120223

(51) Int. Cl.
*H04N 9/80* (2006.01)
*G06F 7/00* (2006.01)
(52) U.S. Cl. ............ 386/240; 707/741; 707/752
(58) Field of Classification Search .......... 345/629; 707/752, 741; 386/46, 124–126, 200, 224, 386/230, 239, 240, 241
See application file for complete search history.

(56) References Cited

U.S. PATENT DOCUMENTS

| | | | | |
|---|---|---|---|---|
| 5,903,309 | A * | 5/1999 | Anderson | 348/333.02 |
| 6,133,928 | A | 10/2000 | Kayashima et al. | |
| 6,871,205 | B1 * | 3/2005 | Yamada et al. | 707/741 |
| 7,260,305 | B2 | 8/2007 | Nakajima et al. | |
| 2003/0026474 | A1 * | 2/2003 | Yano | 382/154 |
| 2003/0107586 | A1 * | 6/2003 | Takiguchi et al. | 345/629 |
| 2003/0151767 | A1 | 8/2003 | Habuta et al. | |
| 2004/0156615 | A1 | 8/2004 | Funazaki | |

FOREIGN PATENT DOCUMENTS

| | | |
|---|---|---|
| JP | 6-340099 A | 12/1994 |
| JP | 9-187976 A | 7/1997 |
| JP | 10-150538 A | 6/1998 |
| JP | 10-150541 A | 6/1998 |
| JP | 11-154218 A | 6/1999 |
| JP | 11-341407 A | 12/1999 |
| JP | 2001-189909 A | 7/2001 |
| JP | 2002-8350 A | 1/2002 |
| JP | 2003-323766 A | 11/2003 |
| JP | 2004-64201 A | 2/2004 |

* cited by examiner

*Primary Examiner* — Thai Tran
*Assistant Examiner* — Mishawn Dunn
(74) *Attorney, Agent, or Firm* — Birch, Stewart, Kolash & Birch LLP

(57) ABSTRACT

To provide the possible largest number of representative images of the image data recorded on the recording medium on the surface of a recording medium which is limited in size. When recording image data recorded on two DVD-Rs on a new DVD-R, a lenticular image synthesis is carried out on the representative images D1 and D2 provided on the surface of the original DVD-Rs and a representative image D3 of the new DVD-R to generate one synthetic representative image D10 and the synthetic representative image D10 is printed on the surface of the new DVD-R.

6 Claims, 7 Drawing Sheets

FIG.3 meta0001_U001.xml

<DATE OF CREATION : 2004.4.9> <creator : FUJI>
<DATE OF PHOTOGRAPHY : 1985.4.6>
<NAME OF USER : ICHIROU YAMADA>
<COMMENT : TAROU'S SPORTS DAY>
<value : NUMBER OF TIMES OF ACCESS◇,DISPLAY TIME◇

```
meta0001_U001.xml
<DATE OF CREATION : 2004.4.9>,<creator : FUJI>
<DATE OF PHOTOGRAPHY : 1985.4.6>
<NAME OF USER : ICHIROU YAMADA>
<COMMENT : TAROU'S SPORTS DAY>
<value : NUMBER OF TIMES OF ACCESS
       <FATHER<3>,MOTHER<2>,DAUGHTER<5>,
         DISPLAY TIME<30>sec,IMAGE QUALITY<SHAKE SMALL>,
       OBJECT<DAUGHTER>,OBJECT SIZE<LARGE>
```

<DIRECTION : LENGTHWISE>,
<creator : ICHIROU YAMADA>,<DATE : 2004.4.10>
<B G M : 002.mp3>,<effect : ZOOM+PANNING+BLURRING>   } ADDED
<creator : ICHIROU YAMADA>,<DATE : 2004.4.11>

FIG.10

| FILE NAME | VALUE | COMPRESSIBILITY |
|---|---|---|
| pm0001_U001_U102.jpg | 0 | 5× |
| pm0002_U001_U102.jpg | 1 | 3× |
| pm0003_U001_U102.jpg | 2 | 2× |
| pm0004_U001_U102.jpg | 3 | 1× |

REPRESENTATIVE IMAGE PROVIDING SYSTEM AND REPRESENTATIVE IMAGE PROVIDING METHOD

BACKGROUND OF THE INVENTION

1. Field of the Invention

This invention relates to a representative image providing system and a representative image providing method for providing the surface of a recording medium such as a DVD-R on which pieces of image data are recorded with representative images respectively representing the pieces of image data recorded on the recording medium, and a computer program for causing a computer to execute the representative image providing method.

2. Description of the Related Art

Prints printed from silver-salt photographic film have been employed for various purposes such as to check the conditions of photos, to show the prints to user's friends to communicate with them, to enlarge the photos for decoration, to apply them to an album, or the like. However, the prints printed from silver-salt photographic film is disadvantageous in that they soon form a mass when ordering is neglected and it is difficult to search for a desired one or to make additional copies of a desired one in the mass. Especially, when prints have formed a mass, since the prints are generally disorderly arranged without taking into account the order of photographing, ordering of the prints becomes harder.

If ordering is frequently done, application of the prints may be facilitated. However, classification of a mass of prints by the order of photographing or theme takes a very long time. Further, even if the prints are ordered and applied to an album, it is difficult for the prints to be enjoyed by many people or by remote people since usually the album is only one.

Further, when ordering of prints is neglected, not only the prints but also the negatives form a mass. In such a case, the negatives are frequently left as they are, and even if ordering of prints is carried out, the negatives are frequently disorderly stored in a box or a bag. Further as the user or the photographer ages, and his or her family becomes large due to his or her children or grandchildren, prints or negatives increase at a high rate, and accordingly, when ordering is neglected, a very large mass of prints or negatives is left. Prints or negatives are seldom discarded since additional prints and/or negatives cannot be printed if prints or negatives are once disposed, and accordingly, many families are now in a difficulty with how to order prints and/or negatives or where prints and/or negatives are to be placed.

There has been proposed a photo service system where the images recorded on the negatives or the prints are read out by an image reading unit such as a scanner, and image data representing the images is stored in a recording medium such as a CD-R so that the images can be enjoyed through a reproduction system such as a personal computer or can be output as a print in response to user's request. (See, for instance, Japanese Unexamined Patent Publication Nos. 10(1998)-150538 or 10(1998)-150541. Further, there has been proposed a network photo service system where image data is transferred to an image storage server, which stores image data, by way of a network such as the internet so that the images can be enjoyed through a terminal unit remote from the image server or variously processed according to the print orders or the like. See, for instance, Japanese Unexamined Patent Publication No. 11(1999)-154218.

However, in the image storage system described above, since the step of developing and printing the negatives involves reading the images recorded on the negatives and storing the obtained image data by film rolls, work of linking the customer who requested storage of the image data with each film roll is troublesome. Further, since in the system, images are only read from negatives and stored, when images are read from a vast amount of negatives or prints left in the home, a very large mass of image data comes to be stored without ordering. In this case, the very large mass of image data must be ordered by the customer himself or herself who has accessed the image storage server and the work is very troublesome as the order of prints or negatives, whereby the system is very inconvenient to use.

Accordingly, there is proposed, as disclosed, for instance, in U.S. Patent Application Publication No. 20030151767, a photo-mining service system where image data is obtained from a recording medium such as prints or photographic film on which images are recorded and the obtained image data is stored linked with recording medium information representing the recording medium from which the image data is obtained customer by customer on the basis of customer information. With this system, the customer can refer to a vast amount of negatives or prints, which have been left in a mass in his or her home, in a state ordered on the basis of the recording medium information by only requesting reading of images to a shop.

In the system disclosed in U.S. Patent Application Publication No. 20030151767, it is conceivable to provide to the customer a recording medium such as a DVD-R on which image data representing images obtained by read-out is recorded. At this time, it is possible to generate image data in a slide show format on the basis of the image data and record it on the recording medium together with the image data. With this, the customer can enjoy a slide show through his or her DVD player as well as to enjoy the image represented by the image data through a terminal unit such as a personal computer.

Whereas, one sometimes wants to deliver image data recorded on a recording medium to others. For example, parents want to deliver their child images related to the child out of the images recorded on a recording medium when the child marries. In such a case, the parents will deliver the recording medium to a shop and the shop reads out from the recording medium image data including the name of the child in the comment attached thereto on the basis of the comments attached to the image data and records the image data read out and image data in a slide show format on a new recording medium.

When the customer repeats the order for photo-mining service, he or she comes to possess a plurality of recording media. In this case, the customer delivers the plurality of recording media to a shop and the shop reads out from the recording media image data including the name of the child in the comment attached thereto on the basis of the comments attached to the image data and records the image data read out on a new recording medium.

Further, there has been put into practice to provide the surface of a recording medium with representative images respectively representing the pieces of image data recorded on the recording medium. With this arrangement, by viewing the surface of the recording medium, what kinds of image data are recorded on the recording medium can be known.

When providing the surface of a recording medium with representative images respectively representing the pieces of image data recorded on the recording medium, it is preferred that all the representative images on the original recording media be provided on the surface of the new recording medium together with the representative images for the image data recorded on the new recording medium. When a recording medium on which desired image data or desired animation data is recorded is searched for among a plurality of recording media on which a large number of pieces of image data are recorded, it is preferred that approximate period at which the desired image data is obtained be easily known. However, since the surface of the recording medium is limited in size, it is difficult to provide all the representative images on the original recording media and the representative images for the image data recorded on the new recording medium on the surface of the new recording medium.

SUMMARY OF THE INVENTION view of the foregoing observations and description, the primary object of the present invention is to provide the possible largest number of representative images on the surface of a recording medium which is limited in size.

In accordance with one aspect of the present invention, there is provided a representative image providing system for providing the surface of a recording medium on which a plurality of pieces of image data are recorded with representative images respectively representing the pieces of image data recorded on the recording medium, wherein the improvement comprises a synthetic means which carries out a lenticular image synthesis, where each of said plurality of representative images is divided into a plurality of strip-like areas, and the divided areas are arranged in a predetermined order, on said representative images to generate at least one synthetic representative image, and a providing means which provides the surface of the recording medium with said at least one synthetic representative image.

In a representative image providing system of the present invention, said synthetic means may arrange said plurality of areas in the order of date on which said plurality of representative images are obtained.

Further, in a representative image providing system of the present invention, when data is recorded on the recording medium in slide show format where images selected from a plurality of pieces of image data are displayed in sequence, said synthetic means may arrange said plurality of areas in the order in which the data is to be reproduced.

Further, a representative image providing system of the present invention may further comprises an index animation file generating means which, when animation files are to be recorded on the recording medium, generates index animation files comprising selected frames selected from the frames forming the animation files and records the index animation files on the recording medium, and a representative image selecting means which selects the representative images from the frames forming the index animation files.

In accordance with another aspect of the present invention, there is provided a representative image providing method of providing the surface of a recording medium on which a plurality of pieces of image data are recorded with representative images respectively representing the pieces of image data recorded on the recording medium, wherein the improvement comprises the steps of carrying out a lenticular image synthesis, where each of said plurality of representative images is divided into a plurality of strip-like areas, and the divided areas are arranged in a predetermined order, on said representative images to generate at least one synthetic representative image, and providing the surface of the recording medium with said at least one synthetic representative image.

Further, a representative image providing method of the present invention may be provided as a program for causing a computer to execute a representative image providing method of the present invention.

In accordance with the present invention, a plurality of representative images are synthesized into at least one synthetic representative image by the lenticular image synthesis, and said at least one synthetic representative image is provided on the surface of a recording medium. Accordingly, a plurality of representative images can be included in a synthetic representative image, whereby the possible largest number of representative images can be provided on the surface of a recording medium which is limited in size.

Further, when the plurality of strip-like areas are arranged in the order of date on which said plurality of representative images are obtained, the period in which the image data recorded on the recording medium is photographed can be easily estimated.

Further, when animation files are to be recorded on the recording medium, index animation files and the representative synthetic images of the representative images selected from the index animation files are provided on the surface of the recording medium, the contents of the animation files recorded on the recording medium can be easily known.

DESCRIPTION OF THE PREFERRED EMBODIMENT

Figure 1:
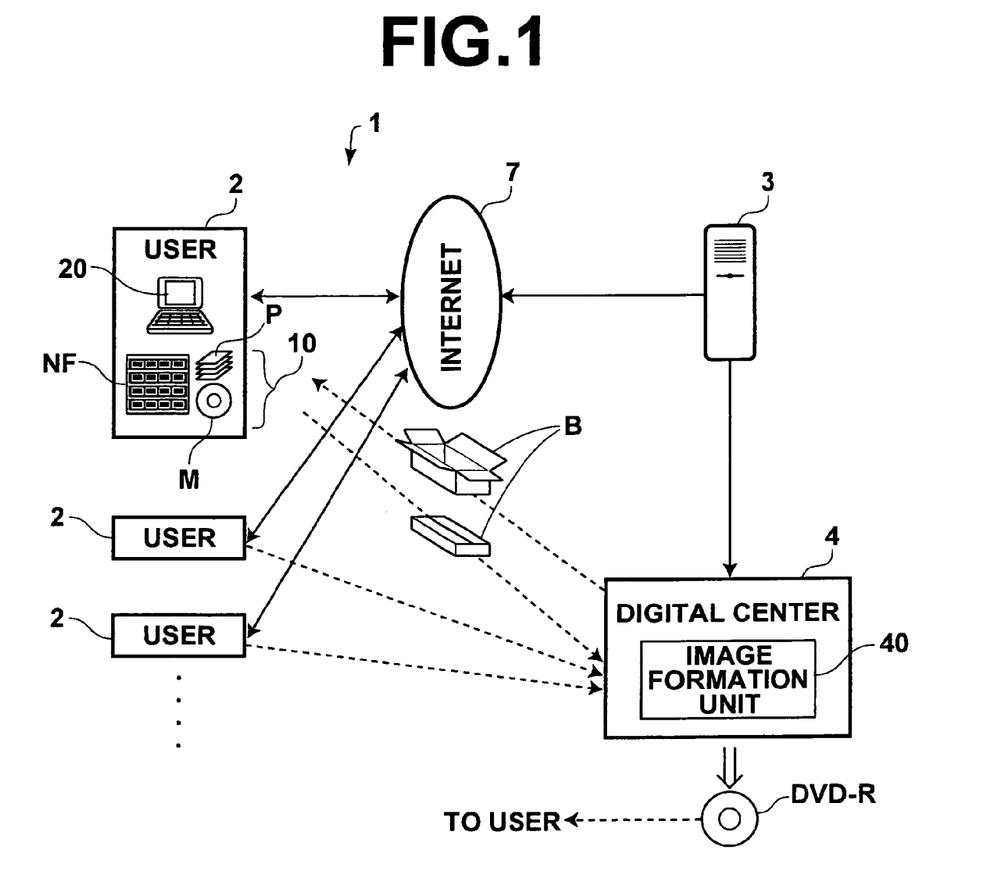
FIG. 1 is a view showing a photo-mining system employing a representative image providing system in accordance with an embodiment of the present invention.

Embodiments of the present invention will be described with reference to the drawings, hereinbelow. FIG. 1 is a view showing in brief a photo-mining system employing a representative image providing system in accordance with an embodiment of the present invention. As shown in FIG. 1, in a photo-mining system 1 employing a representative image providing system in accordance with an embodiment of the present invention, information, negatives and/or prints are communicated between a plurality of users 2, a PM server (photo-mining server) 3 which receives orders for the photo-mining service from the plurality of users 2 by way of the internet and a digital center 4 which processes the orders for the photo-mining service from the users 2.

In this particular embodiment, the photo-mining service is a service where image data SO is obtained from negatives NF, prints P, or media M such as a CD-R and a memory card which the user 2 possesses and a medium such as DVD-R on which the obtained image data SO and a DVD video file in slide show format generated from the obtained image data SO have been recorded is delivered to the user.

The user 2 possesses a vast amount of negatives NF and/or prints P without ordering and has recorded a vast amount of image data on the media M without ordering, and makes an order for the photo-mining service on the vast amount of negatives NF and/or prints P to the PM server 3. That is, the user 2 has a terminal unit 20 such as a personal computer connected to the internet 7, and accesses the PM server 3 by the use of the terminal unit 20 to make an order for the photo-mining service.

The photo-mining system of this embodiment is a membership system and the user 2 registers as a member in the PM server 3 in advance. Upon registration of a member, the user 2 receives a user ID and a password for identifying the user. When registering as a member, the user 2 enters information such as his or her name, address, age, e-mail address, families or the like in the list as user information. The registered user information is entered in the user information databases of the PM server 3 and the digital center 4 to be described later.

The PM server 3 manages the website for receiving the order for photo-mining service, and receives an order for photo-mining service made by the user 2. The user 2 accesses the website of the PM server 3 by the use of the terminal unit 20 to make an order for the photo-mining service, and inputs his or her user ID and password, thereby making order for photo-mining service. The PM server 3 issues an order number upon receipt of the order by the user 2, and transmits an e-mail informing the user 2 of the order number and the delivery time for a confirmation of receipt of the order. Further, the PM server 3 informs the digital center 4 of that it receives an order from the user 2. The information includes the user information, the order number, the delivery time and the date of receipt of the order.

The operator of the digital center 4, upon receipt of the information that the PM server 3 receives an order from the user 2, sends to the user's address a box B for sending the negatives NF, prints P or the medium M (will be referred to as the "recording medium 10", hereinbelow) which the user 2 possesses on the basis of the user information and the user information database stored in the digital center 4 as will be described later. Together with the box B, an order slip on which information such as the order number is recorded is sent to the user 2. Further, the order slip is applied to the box B. A bar code related to the order number is printed on the order slip. It is possible to send the box B from an external trader different from the digital center 4.

Upon receipt of the box B, the user 2 packs the recording medium 10 which he or she possesses in the box B and sends it to the digital center 4. At this time, he or she records the kind of the recording medium, the number of the recording media or comment on the order slip and returns it to the digital center 4.

The digital center 4, upon return of the box B, executes processing for the photo-mining service by the use of an image formation unit 40.

Figure 2:
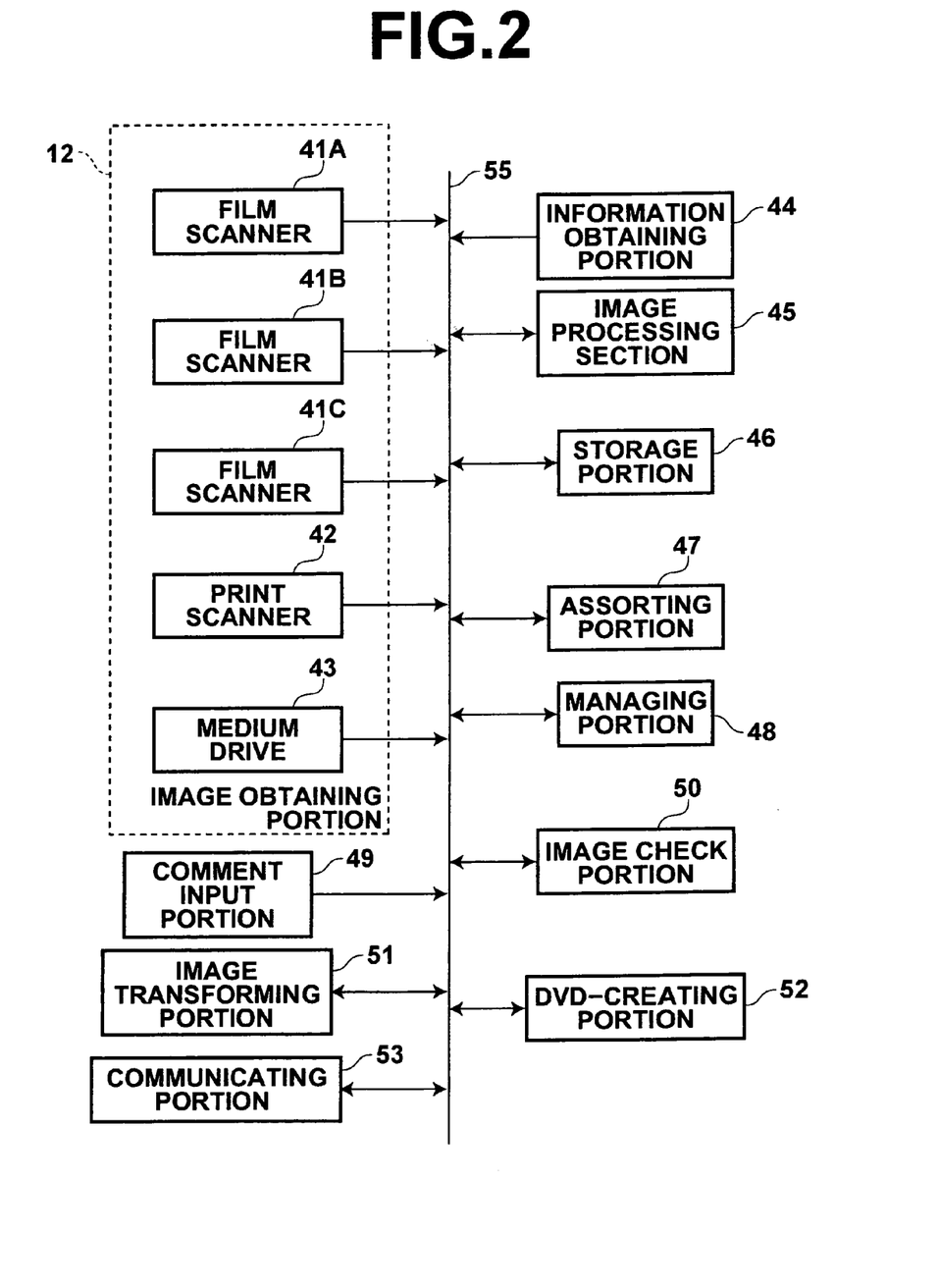
FIG. 2 is a block diagram showing the image formation unit employed in this embodiment.

FIG. 2 shows the image formation unit 40. As shown in FIG. 2, the image formation unit 40 obtains image data from the recording medium 10 to create a DVD-R on which the image data obtained is recorded and comprises three film scanners 41A to 41C each of which obtains image data SO by reading images recorded on negative film NF, a print scanner 42 which obtains image data SO by reading images from prints P, a medium drive 43 which obtains image data SO by reading image data SO from the recording medium M, an information obtaining portion 44 which obtains photographing date information (information on the date of photography) D from the negative film NF and the prints P and from the image data SO read out from the recording medium M and obtains various pieces of information to be attached to the image data SO, an image processing portion 45 which carries out image restoration processing such as image processing or red-eye correction and obtains processed image data S1, and a storage portion 46 which stores various pieces of information including the image data S1.

The image formation unit 40 comprises an assorting portion 47 which determines that image data SO is to be obtained from the recording medium 10 by which of the film scanners 41A to 41C, the print scanner 42 and the medium drive 43 (the elements will be referred to as "the image obtaining portion 12", hereinbelow), a managing portion 48 which manages the kind of the image obtaining portion 12, which obtains image data SO from each of the recording media 10, by the kinds of obtaining processing (will be referred to as "the job", hereinbelow), a comment input portion 49 which receives input of the comment on the image by the job or the image, an image check portion 50 which confirms and corrects an image represented by the processed image data S1, an image transforming portion 51 which transforms the image data S1 into image data S2 in Exif format by providing the image data S1 with various pieces of information such as a comment, a DVD creating portion 52 which creates a DVD-R on which the image data S2 and a DVD-Video file Vo are recorded, and a communicating portion 53 which makes communication with the PM server 3.

The components of the image formation unit 40 are connected with each other by bus 55.

The film scanners 41A to 41C reads in sequence a plurality of images recorded on the negatives NF to obtain a plurality of pieces of image data SO representing the images recorded on the negatives NF.

The print scanner 42 reads images on the print P to obtain image data SO representing the image on the print P.

The medium drive 43 reads out image data SO recorded on the medium M to obtain the image data SO. Since the kinds of the media M are various, a medium drive 43 which conforms to the kind of the medium which has been employed in the field is prepared.

The information obtaining portion 44 obtains the photographing date information D from the negatives NF, the prints P or the like. On the negative film NF, a code number native to the film (will be referred to as "the DX code", hereinbelow.) and the time at which the film is manufactured can be estimated on the basis of the DX code. For this purpose, the information obtaining portion 44 reads the DX code on the negative film NF and obtains the photographing date information D representing the time at which the film is manufactured referring to a film manufacturing date database stored in the storage portion 46.

When the negative film NF. is so-called APS film having a magnetic recording portion where information can be magnetically recorded, the date of photography can be recorded on the magnetic recording portion as magnetic information. In this case, the information obtaining means 44 may read the magnetic information on the magnetic recording portion of the negative film NF as the photographing date information D.

Further, when the date of photography has been imaged in the images, the date of photography can be known by reading the date of photography and executing the character recognition. In this case, the information obtained by reading the date of photography imaged in the image may be employed as the photographing date information D. Depending on the image, it may be difficult to read the date of photography imaged in the image. In such a case, it is possible to obtain the photographing date information D on the image the date of photography of which has been unable to read on the basis of the dates of photography taken after and before the image.

As for the print P, when the date of photography has been imaged in the images, the date of photography can be known by reading the date of photography and executing the character recognition. In this case, the information obtained by reading the date of photography imaged in the print P may be employed as the photographing date information D.

In the case of a rimmed print P, the rim of the print P sometimes includes information representing the period of the print, e.g., "Fujicolor 99". Further, information representing the period of the print (e.g., a brand mark of the print which differs by the year in which the print is sold) may be sometimes printed on the backside of the print P. In this case, the information obtained by reading the rim or the backside of the print P may be employed as the photographing date information D.

Further, the user 2 sometimes writes the date of photography on the film casing, film casing bag and/or the backside of the prints P. Further, the user 2 sometimes writes the date of photography on the order slip by the recording medium 10. In these cases, it is possible to employ the date of photography input into the comment input portion 49 or the like by the operator of the digital center 4 as the photographing date information D.

Since the image data SO read out from the recording medium M carries the photographing date information recorded on its tag, the photographing date information D of the image data SO read out from the recording medium M may be obtained on the basis of the photographing date information recorded on its tag.

Since the photographing date information D can be obtained from the various information sources such as the DX code, the date of photography imaged in the image, the date of photography designated by the user, the information recorded on the rim or the backside of the print P or the information recorded on the tag, it is preferred that the order of priority be determined in advance and the photographing date information D be obtained from one of the information sources according to the order of priority. At this time, it is preferred that the information source from which the photographing date information D is obtained be distinguishable so that it can be recognized. A plurality of combinations of the photographing date information D and the information source may be obtained without determining the order of priority in advance.

Various pieces of information such as on the frame number (when the image data SO is read out from negative film), or the kind of the recording medium from which the image data SO is obtained (from negative film NF, print P or a recording medium M) are obtained by the information obtaining portion 44 as well as the photographing date information D and combined with the photographing date information D to generate information data.

The photographing date information D obtained by the information obtaining portion 44 may be obtained simultaneously with the image obtaining portion 12 obtaining the image data SO. In this case, the information obtaining portion 44 will be provided in the image obtaining portion 12 so that the operator of the image obtaining portion 12 operates the information obtaining portion 44.

The image processing portion 45 carries out image processing for improving the image quality such as gradation processing, color transformation or sharpness processing on the image data SO and obtains the processed image data S1.

The storage portion 46 comprises a large capacity hard disc, and temporarily storages the image data SO obtained by the film scanners 41A to 41C, the print scanner 42 and the medium drive 43 and the processed image data S1. The storage portion 46 further stores the user information database and the period database representing the relation between the DX code and the manufacturing time of the film and the relation between the brand mark and the period of the print.

The information obtaining portion 44 can obtain the photographing date information D representing the period for which the negative film NF is manufactured by reading the DX code recorded on the negative film NF and referring to the period database. Further, the information obtaining portion 44 can obtain the photographing date information D representing the period for which the brand mark is used by reading the brand mark printed on the back side of the print P and referring to the period database.

The assorting portion 47 determines by which element of the image obtaining portion 12, image data SO is to be obtained for a plurality of the recording medium 10 under the designation of the operator.

The managing portion 48 manages the photo-mining service to be executed by the digital center 4. That is, the managing portion 48 manages all the jobs (i.e., receipt of the order, shipping of the box B, receipt of the box B, sorting, obtaining image data SO, image processing, comment input, image check, image transformation, DVD creation, DVD shipping, account settlement and the like) to be executed in the photo-mining service by the user for each order number by the use of a managing database.

The comment input portion 49 receives a comment on the image data SO obtained. Name of the event or the like written by the user 2 on the film sheet of the negative films NF, name of the event or the like written by the user 2 on the backside of the print P or name of the event or the like written by the user 2 on the order slip may be used as the comment.

The image check portion 50 confirms and corrects the processed image data S1.

The image transforming portion 51 transforms the image data S1 into image data S2 in Exif format by attaching in the form of a tag the image data S1 after the image check with various pieces of information registered for each image in the managing database. At this time, the image data S1 to be turned over is transformed into image data S2 after rotation. Further, the file name of the image data S2 is changed to a file name provided with an ID native to the DVD-R on which the image data S2 is to be recorded. For example, if the file name of the image data S2 is originally pm0001.jpg and the ID native to the DVD-R is U001, then the file name of the image data S2 is changed to pm0001_U001.jpg.

Further, the image transforming portion 51 makes meta-data X0 linked with each of the image data S2. The meta-data X0 is a file in the xml format and is provided with a file name corresponding to the image S2. For example, if the file name of the image data S2 pm0001_U001.jpg, the file name of the meta-data X0 thereof is meta0001_U001.xml.

Figure 3:
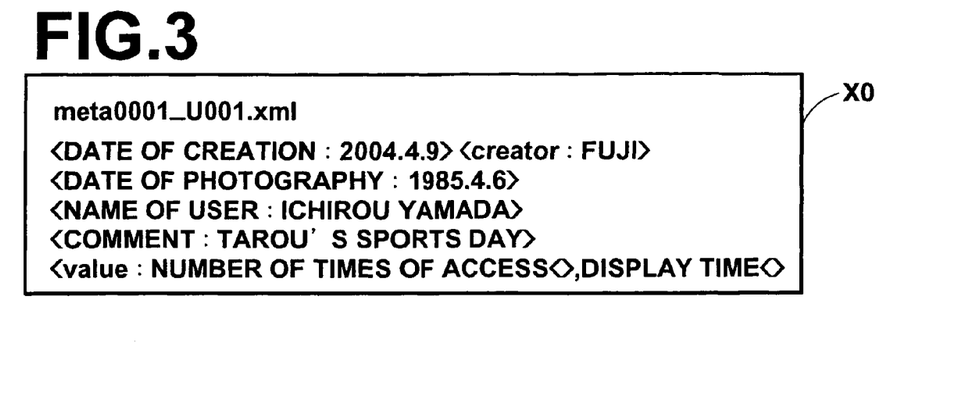
FIG. 3 is a view showing the contents of the meta-data.

FIG. 3 shows the contents of the meta-data X0. As shown in FIG. 3, as the meta-data X0, the file name thereof, the date of creation of the image data S2, the date of photography represented by the photographing date information D, the name of the user who possesses the recording medium 10 from which the image data S2 is obtained, the comment, and the value of the image data S2 are recorded. A postscript is added to the value of the image data S2 when the DVD-R on which the image data S2 is recorded is delivered to the user 2 and the user 2 uses the image data S2. Further, a postscript on the file name of the BGM employed in creation of the DVD-Video file V0, the effects provided when the slide show is reproduced, and the like is added to the meta-data X0 when making the DVD-Video file V0 as to be described later.

The meta-data X0 may be recorded as a file including a plurality of pieces of image data. In this case, an ID native to the disc and file names of the plurality of pieces of image data are recorded in the meta-data X0, like <an ID native to the disc; U001>,<a file name; pm0001_U001.jpg>,<a file name; pm0002_U001.jpg>, . . . . "The ID native to the disc" is an identifier native to the DVD-R to be manufactured. The part corresponding to the ID native to the disc in the file name may be abbreviated like <an ID native to the disc; U001>,<a file name; pm0001.jpg>,<a file name; pm0002.jpg>, The DVD-creating portion 52 records on the DVD-R all the image data S2 and the meta-data X0 generated by the image transforming portion 51, and at the same time, calculates the free capacity of the DVD-R after all the pieces of the image data S2 are recorded, and generates the DVD-Video file V0 conforming to the free capacity (thereafter, it records the DVD-Video file V0 on the DVD-R).

Specifically, the DVD-creating portion 52 classifies the image data S2 into a plurality of groups by the period, selects the pieces of image data S2 according to the free capacity in number, creates a file, in the MPEG format where the images are continuously switched, from the image data S2 selected and carries out the authoring on the title menu, the BGM and the like, thereby making the DVD-Video file V0.

Further, by generating a reproduction file representing the order of reproduction in which the selected images S2 are reproduced and recording the reproduction file on the DVD-R in a predetermined format, a slide show may be reproduced on a player corresponding to the predetermined format in the order of reproduction recorded on the reproduction file. As the "predetermined format", an MPV format, where file names and the reproducing time thereof are recorded in MPV files in the order of reproduction, may be employed. In this system, the order of reproduction can be easily changed, deleted or added by only editing the MPV files. It is preferred that the reproduction file is generated by selecting the images to be included in the DVD-Video file V0.

Further, it is preferred that information on a representative image representative of the images included in the slide show (e.g., its file name) be recorded linked with the reproduction file. Further, it is preferred that the information on the representative image be recorded in the reproduction file. In this case, the information on the representative image may be indicated by adding a representation mark, which shows that the image is a representative image, to the tail of the file name thereof which is recorded in the reproduction file in the order of reproduction. It is preferred that a plurality of, not a single, representation marks be provided.

As the method of selecting the representative images, for instance, a method where the representative images are selected on the basis of the value of the image recorded in the meta-data corresponding to the image as described later and a method where the photographing times of the images to be reproduced in the slide show are divided, and a representative image is selected for each of the divided photographing times can be listed.

Figure 4:
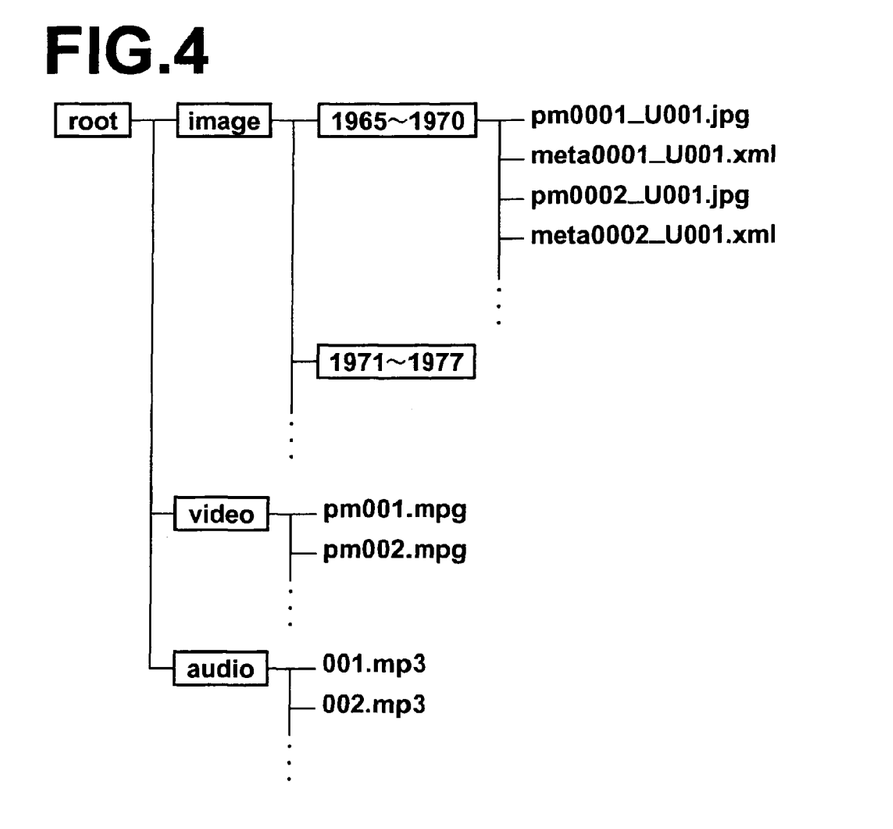
FIG. 4 is a view showing the directory structure of the file of the image data and the DVD-Video file recorded on the DVD-R.

FIG. 4 shows the directory structure of the image data S2 and the DVD-Video file V0 recorded on the DVD-R. As shown in FIG. 4, an image folder which stores the image data S2 together with the meta-data X0, a video folder which stores the DVD-Video file V0 and an audio folder which stores data which is played as a BGM when the DVD-Video file V0 is reproduced are made in the low order of the root directory.

Further, period folders in which the pieces of the image data S2 is classified are made in the low order of the image folder. In each of the period folders, pieces of image data whose file name is pm0001_U001.jpg, pm0002_U001.jpg, . . . and the meta-data X0 whose file name is meta0001_U001.xml, meta0002_U001.xml, are stored.

Further, as shown in FIG. 4, the meta-data X0 may be stored linked with the images or by generating one piece of meta-data X0 corresponding to each of the classified folders, the meta-data X0 may be stored together with the corresponding folder. In this case, additional information on the image to be stored in the corresponding folder, such as its file name, photographing date, value, title, and comment, is recorded in the one piece of meta-data X0. By thus storing one piece of meta-data X0 for each of the folders, what kinds of images are stored in the folder can be easily known by only referring to the meta-data X0. In this case, information on the whole images stored in the folder may be recorded in the meta-data X0 as additional information. "Information on the whole images stored in the folder" means, for instance, the photographing period information (the date on which the images are photographed first and the date on which the images are photographed last), the title of the images and the file name of the representative image representative of the images.

In the video folder, for instance, the DVD-Video files V0 whose file name is pm0001_U001.mpg, pm0002_U001.mpg, . . . are stored. The MPEG data taken by a digital camera or a digital video camera which has been recorded on the recording medium M is further stored in the video folder. It is preferred that an Index-video file corresponding to such MPEG data and/or DVD-Video file V0, for instance, an Index-video file Vidx which is pmIndex001.mpg, pmIndex002.mpg, . . . in its file name be stored in the video folder. The Index-video file Vidx has been made by selecting only representative several frames from pm001.mpg, pm002.mpg . . . which are original video files and displayed on a selection screen, for instance, when DVD-Video files V0 to be reproduced by a DVD player are selected.

In the audio folder, a plurality of pieces of music data are stored so that the user 2 can select the music which is played as a BGM when the DVD-Video file V0 is reproduced. In the audio folder, for instance, the music data whose file name is 001.mp3, 002.mp3, . . . are stored.

Figure 5:
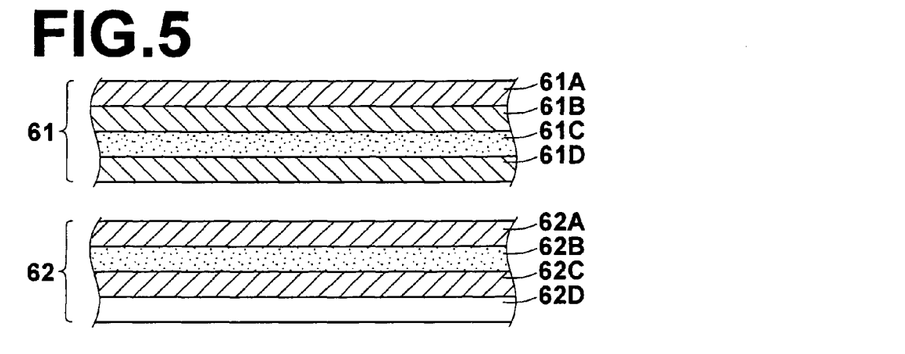
FIG. 5 is a cross-sectional view showing the structure of the DVD-R which is employed in this embodiment (first)

FIG. 5 shows a cross-section showing the structure of the DVD-R employed in this embodiment. As shown in FIG. 5, the DVD-R employed in this embodiment comprises a first recording layer 61 and a second recording layer 62. The first recording layer 61 comprises a protective layer 61A, a first SiO$_2$ layer 61B, an organic pigment layer 61C and a second SiO$_2$ layer 61D, and information is recorded by breakage of the organic pigment layer 61C by a laser beam. The second recording layer 62 comprises a first SiO$_2$ layer 62A, a phase change metal layer 62B, a second SiO$_2$ layer 62C and a polycarbonate substrate 62D, and information is recorded by phase change of the phase change metal layer 62B where the phase change metal layer 62B is heated to change its crystal condition by a laser beam.

The first recording layer 61 which is positioned deeper in the DVD-R than the second recording layer 62 is less probable to be damaged and accordingly is higher in safety than the second recording layer 62. Further, as compared with the phase change metal layer 62B, the organic pigment layer 61C is higher in durability.

Accordingly, in this embodiment, data which is irrevocable when broken as the image data S2 obtained from the recording medium 10 of the user 2 is recorded on the first recording layer 61 and data which can be reproduced even if broken as the meta-data X0, the DVD-Video file V0 or the music data is recorded on the second recording layer 62. The second recording layer 62 may be rewritable.

Figure 6:
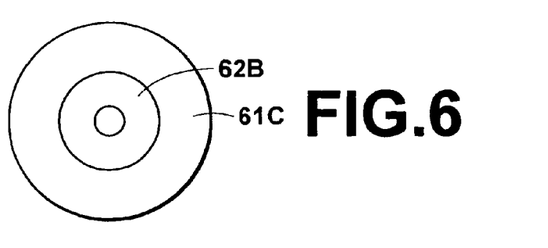
FIG. 6 is a cross-sectional view showing the structure of the DVD-R which is employed in this embodiment (second)

The DVD-R which may be employed in this embodiment need not be limited to those of the two-layer structure described above, but a DVD-R having a phase change metal layer 62B in the second recording layer 6 on the outer periphery side of the disc and an organic pigment layer 61C in the first recording layer 61 on the inner periphery side of the disc as shown in FIG. 6 may be employed. In the DVD-R, the rotational speed is slower on the inner periphery side than on the outer periphery side, and a probability that writing of data is failed is less on the inner periphery side than on the outer periphery side.

Figure 7:
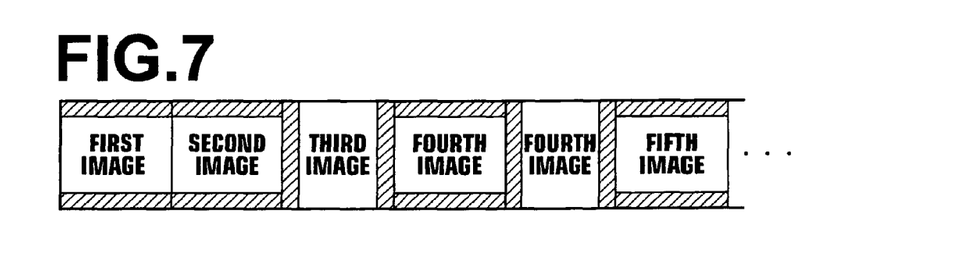
FIG. 7 is a view for illustrating the state where an image whose upper and lower sides are unchanged and an image changed to be longer in the vertical side thereof are continuously reproduced.

In this embodiment, the upper or lower side of the image represented by image data S2 to be included in the DVD-Video file V0 is sometimes not known when the DVD-Video file V0 is made. In such a case, the DVD-Video file V0 is made so that an image whose upper and lower sides are unchanged and an image changed to be longer in the vertical side thereof are continuously reproduced on the basis of the image data S2 when the slide show is performed. FIG. 7 is a view for illustrating the state where an image whose upper and lower sides are unchanged and an image changed to be longer in the vertical sides thereof are continuously reproduced. In FIG. 7, the image 4 which is to be reproduced fourth in the slide show is reproduced both in the states where its upper and lower sides are kept unchanged and its longer sides are directed vertical.

By thus continuously reproducing an image whose upper and lower sides are unchanged and an image changed to be longer in the vertical side thereof when the upper side or the lower side of the image is unknown, the user 2 can check which of the images continuously reproduced is correct in the direction. Further, the user 2 may skip the image whose direction is wrong by the use of the user terminal unit 20 or a DVD player having a function of edition and may store information representing the skipped image. With this, the skipped image is not reproduced by referring to the stored information when the DVD-Video file V0 is reproduced again. Accordingly, a slide show including only the images which are correct in direction can be performed.

Further, it is possible to make a DVD-Video file V0 from image data S2 including in its comment a predetermined keyword such as "sports day" or the name of the user's son or daughter together with the DVD-Video file V0 classified by the period. For example, a DVD-Video file V1 including in its comment "sports day" as the keyword may be created and the DVD-Video file V1 may be linked with the images of sports day included in the DVD-Video file V0 by the period.

Figure 8:
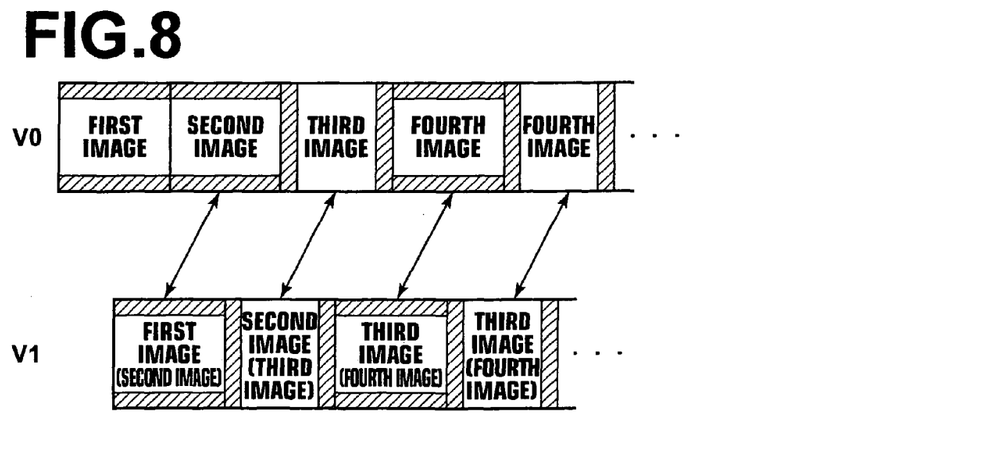
FIG. 8 is a view for illustrating the link between the DVD-Video files.

FIG. 8 is a view for illustrating the link between the DVD-Video files. Assuming that each of second, third and fourth images in the DVD-Video file V0 includes in its comment "sports day" and first, second, and third images in the DVD-Video file V1 correspond to the second, third and fourth images in the DVD-Video file V0, the second, third and fourth images in the DVD-Video file V0 are linked, respectively, with the first, second, and third images in the DVD-Video file V1.

With this, when the user 2 operates to move the link when the second image is displayed while the DVD-Video file V0 is being reproduced, the DVD-Video file V1 is reproduced from the first image thereof. Accordingly, when an image of a sports day is displayed while a given slide show is being performed, a slide show including only the images of the "sports day" can be performed following the image.

A representative image of the pieces of image data S2 recorded on a DVD-R may be printed on the surface of the DVD-R. Further, an ID native to the DVD-R may be printed on the surface of the DVD-R.

The DVD-R thus made is sent to the user 2 who has made the order.

The user 2 can enjoy a slide show by reproducing the DVD-Video file V0 recorded on the DVD-R. Further, the user 2 can enjoy the DVD-Video file V0 by displaying on the user terminal unit 20 the pieces of image data S2 recorded on the DVD-R in a table or by processing the same by himself or by herself.

A medium on which information representing a slide show sequence comprising various demonstration images and BGMs may be provided to the user 2 so that the user 2 can replace the demonstration image in the slide show sequence with the image data S2 recorded on the DVD-R and can enjoy the user's image in various forms of slide shows.

The user 2 has installed in the user terminal unit 20 a viewer exclusively for the photo-mining service, and the user 2 can change the direction of the longer sides of the image data S2 recorded on the DVD-R, the BGM of the DVD-Video file V0, the effect of the DVD-Video file V0 upon reproduction, the comment for each image, and the like by the use of the viewer.

Further, the user 2 copies all the meta-data X0 recorded on the DVD-R to the user terminal unit 20 by the use of the viewer when the image data S2 is displayed and adds the contents of change to the meta-data X0 of the image data S2 which has been changed each time change is effected as described above.

Figure 9:
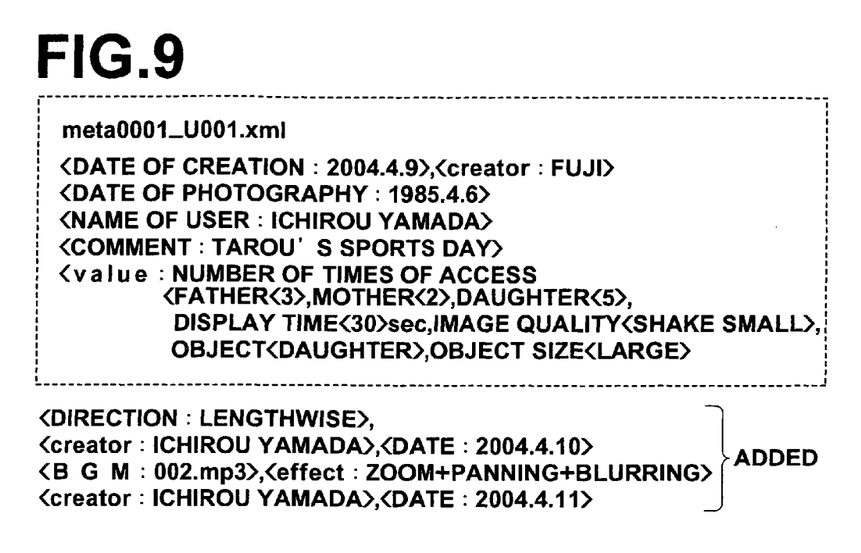
FIG. 9 is a view for illustrating the postscript added to the meta-data.

FIG. 9 is a view for illustrating the postscript added to the meta-data X0. In FIG. 9, the part surrounded by the dashed line is the original contents of the meta-data X0. When the direction of the long sides of the image data S2 corresponding to the meta-data X0 has been changed, information "direction: lengthwise" and information on the creator of the information and the date of creation of the information "creator: Ichirou Yamada", "2004.4.10" are added to the meta-data X0. When the BCM and the effect at reproduction are changed in the DVD-Video file V0 including the image data S2, information "BGM: 002.mp3" "effect: zoom+pan+blurring" and information on the creator of the information and the date of creation of the information "creator: Hanako Yamada", "2004.4.11" are added to the meta-data X0.

Though the name of creator may be written after logging in the user terminal unit 20 and carrying out the change, the system may be arranged so that the name of the accessor can be selected when the viewer is risen, and the name of the accessor selected may be employed as the name of creator. At this time, the image of the face of the accessor may be displayed together with the name of the accessor on the screen for selecting the name of the accessor.

Further, each time the image data S2 is displayed by the user 2, a postscript is added to the "value" of the meta-data X0. Specifically, the number of the times of display, the total display time, the image quality, the number of the objects and the size of the desired object are added to the meta-data X0 for the user 2 which has displayed the image data S2. The number of the times of display for the user 2 is counted according to the name of the user who logs in the user terminal unit 20 and displays the image data S2 or the name of the accessor selected when the viewer is risen. The display time is the total of the time for which the image data S2 is displayed irrespectively of the user 2. The image quality and the size of the object are added to the meta-data X0 when one of the users 2 inputs them as a value by the use of a viewer software.

One sometimes wants to deliver image data S2 recorded on the DVD-R to others. For example, the user 2 wants to deliver his or her child images related to the child out of the images recorded on the DVD-R when the child marries. Further, when the user 2 repeats the order for photo-mining service and he or she comes to possess a plurality of DVD-Rs, it is preferred that the pieces of image data S2 in all the DVD-Rs be recorded in one DVD-R or the user 2 wants to deliver his or her child images related to the child out of the images recorded on a plurality of the DVD-Rs.

In this case, the user 2 sends the DVD-R the user 2 possesses to the digital center 4 and makes an order for another DVD-R. In the digital center 4, the image formation unit 40 reads out from the DVD-R the pieces of image data S2 related to the child referring to the comment or the like provided to each image data S2, generates images in the slide show format from the image data S2 read out, and records the images in the slide show format on said another DVD-R together with the image data S2 read out. In the case where the user 2 repeats the order for photo-mining service and he or she comes to possess a plurality of DVD-Rs, the user 2 sends all the DVD-Rs the user 2 possesses to the digital center 4 and makes an order for another DVD-R.

When the digital center 4 makes a new DVD-R in this manner, the user 2 delivers the DVD-R together with the meta-data X0 on which a postscript has been added in the viewer. Specifically, the meta-data X0 is delivered to the digital center 4 by transmitting from the user terminal unit 20 by way of the internet 7, sending a recording medium such as a memory card, which has been possessed by the user 2 or which has been provided to the user 2 for a free charge in the photo-mining service, on which the meta-data X0 has been recorded, or by sending a rewritable DVD-R or DVD-R having a rewritable area on which the meta-data X0 has been recorded. Since the meta-data X0 delivered to the digital center 4 includes in its file name an ID native to the DVD-R, the meta-data X0 can be easily linked with the DVD-R.

Formation of a new DVD-R will be described, hereinbelow. A new DVD-R is made by the image formation unit 40. The following description will be made on the basis of the assumption that the user 2 has a pair of DVD-Rs 100 and 101 and the image data S2 related to the daughter of the user 2 is recorded on a new DVD-R 102 out of the image data recorded on the pair of DVD-Rs 100 and 101.

Figure 14:
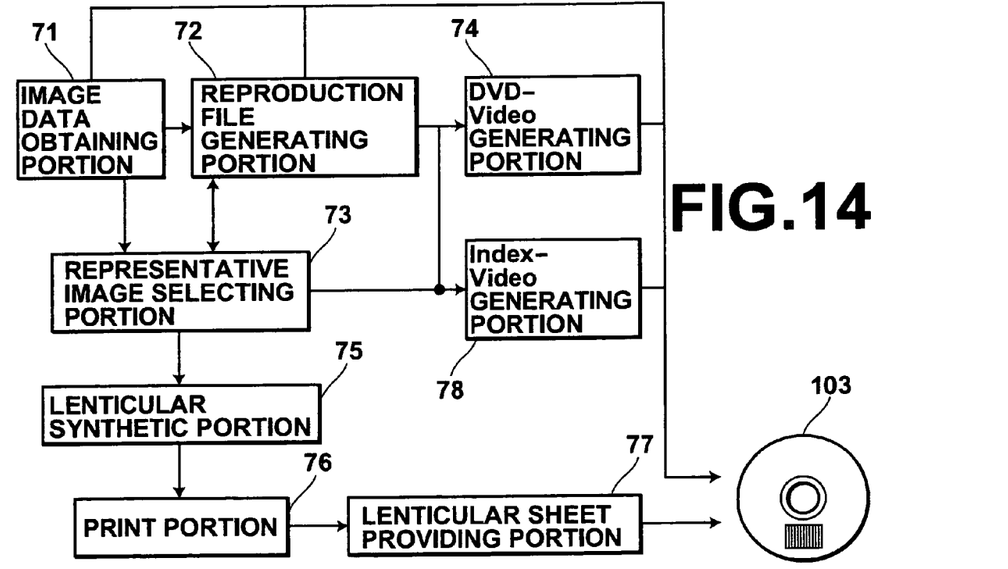
FIG. 14 is a block diagram showing an example of the DVD creating portion.

The DVD creating portion 52 first selects image data S12 including in its comment characters "daughter" or the name of the daughter out of the image data S2 recorded on the DVD-Rs 100 and 101. Then the DVD creating portion 52 calculates the evaluation of each of the pieces of image data referring to the information on the value recorded on each of the meta-data X0 for all the pieces of image data S12 selected. As described above, the information on the value includes the number of the times of display, the total display time, the image quality, the number of the objects and the size of the object for the user 2.

In this embodiment, the DVD creating portion 52 calculates the value Val0 of the image data S12 according to the following formula (1).

$$V0 = ax_1 + bx_2 + cx_3 + dx_4 + ex_5 + fx_6 \qquad (1)$$

wherein a, b, c, d, e and f are weight coefficients, respectively, and $x_1$, $x_2$, $x_3$, $x_4$, $x_5$ and $x_6$ respectively represents the number of the times of display (the number of the times of display of the daughter, in this embodiment), the display time, the quantity of information of the meta-data X0, the image quality, the number of the objects and the size of the object.

In the above formula (1), as the number of the times of display of the daughter, the display time, the quantity of information of the meta-data X0, the value of the image quality, the number of the objects and the size of the object increase, the value Val0 increases and the value of the value Val0 more reflects the taste of the daughter of the user 2 for which the DVD-R 102 is made.

The value Val0 thus calculated is added to the meta-data X0 of each of the pieces of image data S12 with the creator "FUJI". In this particular embodiment, the value Val0 is added, for instance, in four stages 0 to 3 according to the range of the value of the value Val0 calculated.

Then the image transforming portion 51 changes the file name by adding the ID native to the new DVD-R 102 on which the image data S12 is recorded. For example, when the ID native to the new DVD-R 102 is U102 and the file name of the image data S12 read out from the DVD-R 100 is pm0001_U001.jpg, the file name of the image data S12 is changed to pm0001_U001_U102.jpg. Further, when the file name of the image data S12 read out from the DVD-R 101 is pm0001_U002.jpg, the file name of the image data S12 is changed to pm0001_U002_U102.jpg. Since the pieces of image data S12 respectively read out from the DVD-Rs 100 and 101 have been given the ID native to the DVD-R, the file names never double.

Further, meta-data X0 is made linked with the image data S12. This meta-data X0 is obtained by adding to the meta-data X0 delivered from the user 2 information on the value, the file name of the BGM to be used in the newly created DVD-Video file Vo, the effects provided when the slide show is reproduced, and the like.

The meta-data X0 maybe recorded as a file including a plurality of images which have been recorded on the same DVD-R In this case, two IDs native to the discs and file names of the plurality of pieces of image data are recorded in the meta-data X0, like <an ID native to the disc; U001>, <an ID native to the disc; U102>,<a file name; pm0001_U001_U102.jpg>, . . . . When the same file names are not in the same directory by, for instance, storing images, which are different in the original discs, in different directories, the part corresponding to the ID native to the disc in the file name may be abbreviated like <an ID native to the disc; U001>,<an ID native to the disc; U102>,<a file name; pm0001.jpg>, . . . . Further, when information on the date on which the image data is recorded is recorded in the meta-data X0, when and from which DVD-R the meta-data X0 is copied can be easily known.

The DVD creating portion 52 classifies into folders all the pieces of image data whose file names have been changed and the meta-data X0 according to the period and records them on the new DVD-R 102. At the same time, the DVD creating portion 52 calculates the free capacity of the DVD-R after all the pieces of the image data S12 are recorded, and generates the DVD-Video file V0 conforming to the free capacity and thereafter, records the DVD-Video file V0 on the new DVD-R 102.

Figure 10:
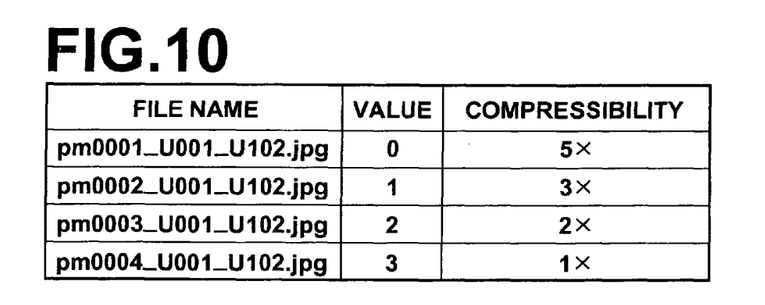
FIG. 10 is a view for illustrating the change of the compressibilities according to the value.

When the pieces of image data S12 related to the daughter of the user 2 are read out from the pair of DVD-Rs 100 and 101 and are recorded on one DVD-R 102, the total volume of the image data S12 sometimes exceeds the capacity of the DVD-R 102. In such a case, in this embodiment, the information on the value recorded on the meta-data X0 for each piece of image data S12 is referred to, and the compressibilities of the pieces of image data S12 are stepwise changed according to the value of the value V0. The reason why the compressibilities of the pieces of image data S12 are increased as the value of the value V0 decreases is that the image data of a low value gives rise to no substantial problem to the user 2 even if the compressibility thereof is increased and the image quality is deteriorated.

FIG. 10 is a view for illustrating the change of the compressibilities according to the value. As shown in FIG. 10, assuming that there are four pieces of image data S12 whose file names are pm0001_U001_U102.jpg, pm0002_U001_U102.jpg, pm0003_U001_U102.jpg and pm0004_U001_U102.jpg, and whose values are 0 to 3, the compressibilities of the respective pieces of image data are 5×, 3×, 2× and 1× (unchanged).

Further, the image data S12 which is in the lowest stage in value need not be recorded on the new DVD-R 102. By this, the total volume of the pieces of image data S12 can be reduced.

Figure 11:
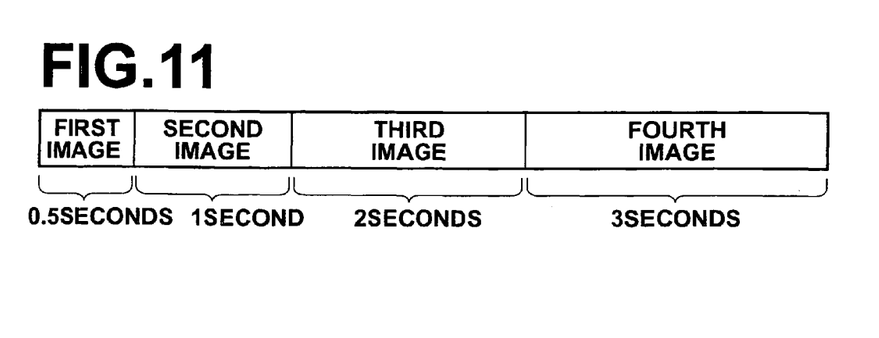
FIG. 11 is a view for illustrating the difference in the reproduction time according to the value in the DVD-Video file V0.

Further, the DVD creating portion 52 selects image data S12 uniformly from the folders and makes DVD-Video file V0 to be recorded on the new DVD-R 102. At this time, the DVD creating portion 52 refers to the information on the value recorded in the pieces of meta-data X0 for the selected pieces of image data S12, and makes the DVD-Video file V0 so that the reproduction time of the image represented by image data S12 of a higher value is longer. For example, since the information on the value is expressed in four stages 0 to 3 in this embodiment, as the information on the value increases from 0 to 3, the reproduction time is increased, for instance, as 0.5 seconds, one second, 2 seconds and 4 seconds. FIG. 11 is a view for illustrating the difference in the reproduction time according to the value in the DVD-Video file V0. In FIG. 11, four pieces of image data S12 whose file names are pm0001_U001_U$_{102}$.jpg, pm0002_U001_U102.jpg, pm0003_U001_U102.jpg and pm0004_U001_U102.jpg described above in conjunction with FIG. 10 are shown as the first to fourth images, respectively. The DVD creating portion 52 makes the DVD-Video file V0 so that the reproduction time of the image data S12 is increased as the value of the image data S12 increases as shown in FIG. 11.

Further, also the new DVD-R 102 may be printed on its surface with representative images representative of the pieces of image data S12. At this time, the representative images may represent pieces of image data S12 which are selected in sequence from that of the highest value. The surface of the new DVD-R 102 may be printed with IDs native to the original DVD-Rs 100 and 101 and with an ID native to the new DVD-R 102.

Figure 12:
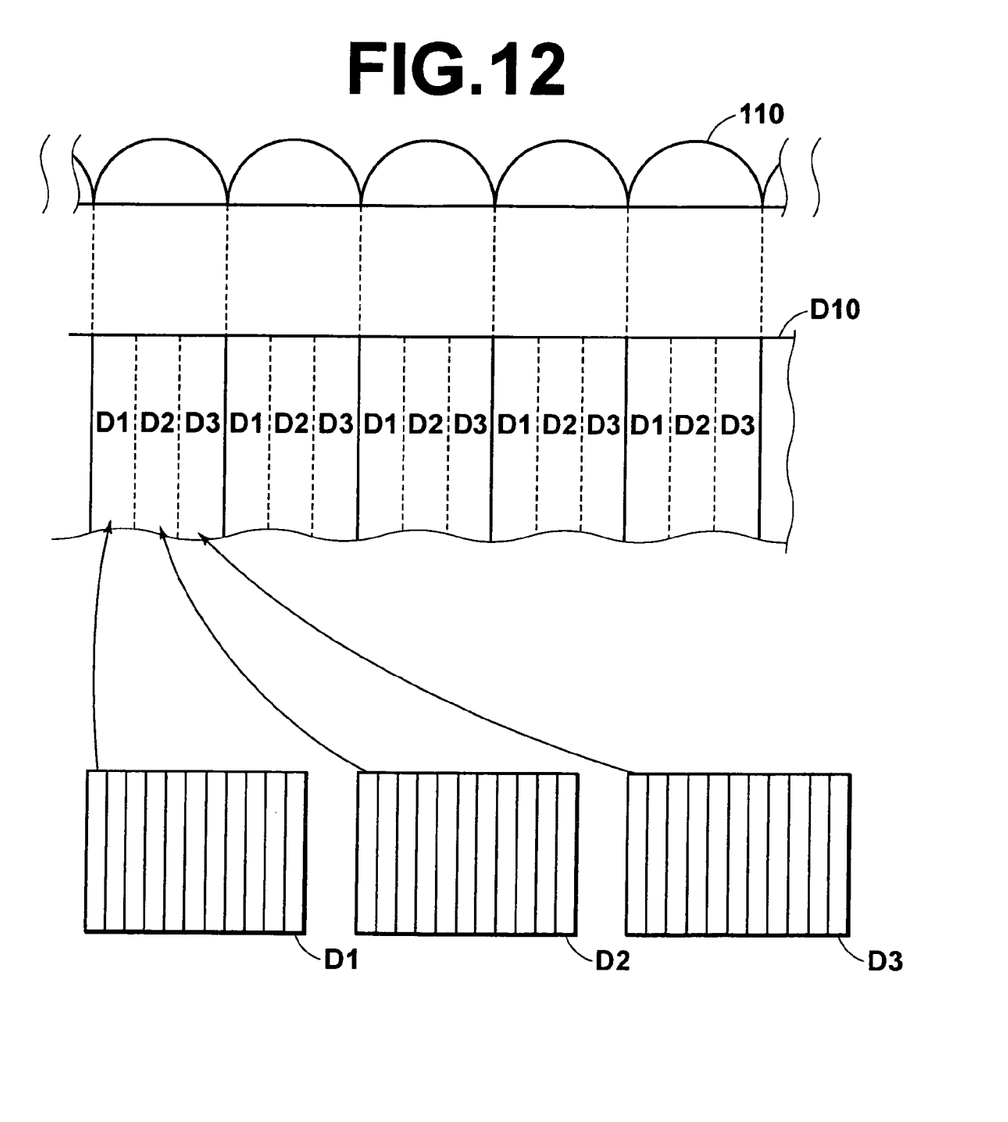
FIG. 12 is a view for illustrating a lenticular image synthesis of three images.

In the case of this embodiment, where the image data S12 is read out from a pair of DVD-Rs 100 and 101, representative images representative of the image data S12 recorded on the pair of DVD-Rs 100 and 101 are sometimes printed on the surface of each of the DVD-Rs 100 and 101. In this case, it is preferred that the representative images on the DVD-Rs 100 and 101 be printed on the surface of the new DVD-R 102 since from which DVD-R the new DVD-R 102 is made is known from the representative images on the surface of the new DVD-R 102. However, since the surface of the DVD-R is limited in size, it is difficult to print all the representative images on the original DVD-Rs 100 and 101 and the representative images on the new DVD-R 102 on the surface of one DVD-R.

Accordingly, in this embodiment, a lenticular image synthesis is carried out on the representative images on the three DVD-Rs to generate at least one synthetic representative image and the synthetic representative image is printed on the surface of the new DVD-R 102. FIG. 12 is a view for illustrating a lenticular image synthesis of three images. In FIG. 12, a lenticular sheet 110 is shown in a cross-section. In this example, the leriticular image synthesis of one representative image each printed on the surface of the DVD-R will be described. Further, the lenticular image synthesis is carried out by the use of image data S2 representing the representative images read out from the DVD-Rs 100 and 101, and a piece of image data S12 selected as representing the representative images out of the pieces of image data S12 recorded on the new DVD-R 102.

Representative images D1 and D2 respectively printed on the surfaces of the DVD-Rs 100 and 101 and a representative image D3 to be printed on the surface of the new DVD-R 102 are first divided into three strip-like areas having equal widths of one lens of a lenticular sheet 110, and the three representative images D1 to D3 are synthesized, so that the strip-like areas each corresponding to the same position of the representative images D1 to D3 are included in the width of one lenticular (the lenticular width), into a synthesized representative image D10. Then the synthesized representative image D10 is printed on the surface of the DVD-R 102, and the lenticular sheet 110 is applied to the surface of the DVD-R 102 over the synthesized representative image D10, whereby print of a representative image on the surface of the new DVD-R 102 is ended.

By printing a representative image on the surface of the new DVD-R 102 in this manner, viewed image is switched between representative images for the original DVD-Rs 100 and 101 and representative image for the new DVD-R 102 when the DVD-R 102 is inclined, whereby from which DVD-R the new DVD-R 102 i s made is known from the representative images on the surface of the new DVD-R 102.

It is preferred that representative images D1 to D3 be selected from the folders recorded on the DVD-R in the order of period and the strip-like areas obtained by dividing the selected representative images D1 to D3 be arranged in the order of period in the corresponding position. Also in the case where a plurality of representative images D1 to D3 are selected from one folder, the strip-like areas may be arranged in the order of date in the corresponding position.

When the reproduction file is recorded on the DVD-R, it is preferred that the representative images D1 to D3 be selected on the basis of the record of the reproduction file, and the strip-like areas obtained by dividing the selected representative images D1 to D3 be arranged in the order of reproduction in the corresponding position.

When the Index-Video file VidX is recorded on the DVD-R, it is preferred that frame data selected from the frame images forming it be selected as the representative images D1 to D3.

Figure 13:
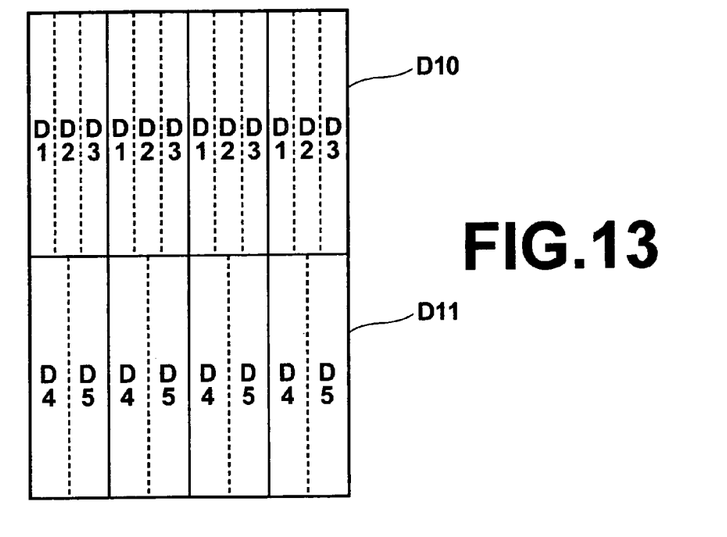
FIG. 13 is a view showing a state where, when the lenticular image synthesis is to be carried out, a strip-like area is arranged contiguously to a strip-like area of an image in the longitudinal direction thereof.

When the lenticular image synthesis is to be carried out, the number of images to be partly displayed can be increased by arranging a strip-like areas contiguously to a strip-like area of an image in the longitudinal direction thereof. FIG. 13 is a view showing an example of this. In FIG. 13, a synthetic representative image D11 for representative images D4 and D5 is arranged below a synthetic representative image D10 for the representative images D1 to D3 in the longitudinal direction thereof. In this case, it is preferred that the strip-like areas respectively obtained by dividing the representative images D1 to D5 be arranged in the order of period like D1→D4→D2→D5→D3 in the corresponding position.

FIG. 14 is a block diagram showing an example of the DVD creating portion 52. The reference numeral of the DVD-R to be created is assumed to be 103, here. As shown in FIG. 14, the DVD creating portion 52 comprises an image data obtaining portion 71, a reproduction file generating portion 72 which generates a reproduction file, a representative image selecting portion 73 which selects the representative image, a DVD-Video generating portion 74 which generates a DVD-Video File V0, a lenticular synthetic portion 75 which carries out a lenticular image synthesis and generates a synthetic representative image, a print portion 76 which prints a synthetic representative image of the representative images obtained by the lenticular synthesis on the lenticular sheet or the surface of the DVD-R103, a lenticular sheet providing portion 77 which provides a lenticular sheet to the synthetic representative image, and an Index-Video generating portion 78 which generates an Index-Video file VidX.

Operation of the DVD creating portion 52 shown FIG. 14 will be described, hereinbelow. Pieces of image data taken in the image data obtaining portion 71 are grouped into predetermined folders and recorded on the DVD-R103 together with the meta-data. The reproduction file generating portion 72 selects images to be included in the DVD-Video File V0 and generates a reproduction file which indicates the order of reproduction and the reproducing time and record them on the DVD-R103. The DVD-Video generating portion 74 generates a DVD-Video File V0 in a slide show format on the basis of the reproduction file and record it on the DVD-R103.

On the other hand, the representative image selecting portion 73 selects the representative image on the basis of the meta-data and the like. The Index-Video generating portion 78 generates an Index-Video file VidX on the basis of the representative images selected by the representative image selecting portion 73 and the contents of the reproduction file generated by the reproduction file generating portion 72 and record it on the DVD-R103.

The lenticular synthetic portion 75 divided a plurality of representative images selected by the representative image selecting portion 73 into strip-like areas and carries out a lenticular image synthesis to synthesize the areas in the order of date or reproduction and generate a synthetic representative image.

The print portion 76 prints the synthetic representative image generated by the lenticular synthetic portion 75 on the lenticular sheet or the surface of the DVD-R103.

The lenticular sheet providing portion 77 provides the lenticular sheet to the surface of the DVD-R103.

By thus providing a synthetic representative image synthesized in the lenticular synthesis to the surface of the DVD-R103, a brief preview of the slide show can be carried out by viewing the surface of the DVD-R103 while inclining the DVD-R103 before it is loaded in a DVD player when the photographs are enjoyed through reproduction in a slide show by the DVD player. Accordingly, what images are recorded on a slide show on the DVD-R103 or images of which periods are recorded on the DVD-R103 can be recognized at first glance.

In the digital center 4, it is possible to manage the ID native to the DVD-R delivered to a user by the user and to manage the DVD-R from which the pieces of image data recorded on a given DVD-R are read out by way of the ID native to the DVD-R. With this arrangement, even if the user loses the DVD-R, if only the ID of the lost DVD-R is known, the digital center 4 can know the DVD-R from which the image data recorded on the lost DVD-R is read out by the user informing the digital center 4 of the ID of the lost DVD-R. Accordingly, though the lost DVD-R cannot be restored when image data recorded on the lost DVD-R is recorded on a DVD-R for the first time but when the image data recorded on the lost DVD-R is recorded on a DVD-R by reading out the image data from another DVD-R, the lost DVD-R can be restored by requesting the user to send the original DVD-R from which the image data recorded on the lost DVD-R is read out or the image data recorded on the original DVD-R.

Further, when the user informs the digital center 4 of loss of a DVD-R and each time the digital center 4 receives an order of creating a new DVD-R by the use of the original DVD-R on which the image data recorded on the lost DVD-R is recorded, the digital center 4 stores the image data recorded on the original DVD-R, a DVD-R on which pieces of image data the same as those recorded on the lost DVD-R are recorded can be obtained by creating a new DVD-R on which the stored image data is recorded when all the pieces of image data recorded on the lost DVD-R are stored. Accordingly, though it takes a long time, it is possible that the user informs the digital center 4 of loss of a DVD-R, and the digital center 4 creates a DVD-R the same as the lost DVD-R.

Further, it is possible to code pieces of image data which have been recorded on the original DVD-R but not used in creation of the new DVD-R or provide the same with invisible properties and to record the image data coded or provided with invisible properties on a new DVD-R and to manage the information in the digital center 4.

Since the DVD is large in capacity and there is a possibility that a DVD having a capacity much larger than that of the current DVD is put into practice, it is possible to code pieces of image data which have been recorded on the original DVD-R but not used in creation of the new DVD-R or provide the same with invisible properties and to record the image data coded or provided with invisible properties on a new DVD-R.

With this arrangement, even if the user loses the DVD-R, since the pieces of image data recorded on the DVD-R are all recorded on another DVD-R, the lost DVD-R can be restored in the digital center 4 by obtaining said another DVD-R and decoding or visualizing the image data.

In the above embodiment, it is possible to request a shop through a terminal unit in the shop to make a DVD-Video file V0 by the use of image data recorded on a DVD-R. At this time, it is possible to access a music server to download therefrom music data and make the DVD-Video file V0 by obtaining in advance the ID of the data of the BGM which the user wants to include in the slide show by selecting it through a cellular phone or a terminal unit in the shop with the terminal unit in the shop connected to the music server, which stores pieces of music data linked with their IDs, and inputting the ID upon creation of the DVD-Video file V0.

What is claimed is:

1. A representative image providing system for providing the surface of a recording medium on which a plurality of pieces of image data are recorded with representative images respectively representing the pieces of image data recorded on the recording medium, wherein the improvement comprising a synthetic means which carries out a lenticular image synthesis, where each of said plurality of representative images is divided into a plurality of strip-like areas, and the divided areas are arranged in a predetermined order, on said representative images to generate at least one synthetic representative image, and a providing means which provides the surface of the recording medium with said at least one synthetic representative image, wherein said synthetic means arranges said plurality of areas in the order of date on which said plurality of representative images are obtained.

2. A representative image providing system for providing the surface of a recording medium on which a plurality of pieces of image data are recorded with representative images respectively representing the pieces of image data recorded on the recording medium, wherein the improvement comprising a synthetic means which carries out a lenticular image synthesis, where each of said plurality of representative images is divided into a plurality of strip-like areas, and the divided areas are arranged in a predetermined order, on said representative images to generate at least one synthetic representative image, and a providing means which provides the surface of the recording medium with said at least one synthetic representative image, wherein when data is recorded on the recording medium in slide show format where images selected from a plurality of pieces of image data are displayed in sequence, said synthetic means arranges said plurality of areas in the order in which the data is to be reproduced.

3. A representative image providing method of providing the surface of a recording medium on which a plurality of pieces of image data are recorded with representative images respectively representing the pieces of image data recorded on the recording medium, wherein the improvement comprising steps of carrying out a lenticular image synthesis, where each of said plurality of representative images is divided into a plurality of strip-like areas, and the divided areas are arranged in a predetermined order, on said representative images to generate at least one synthetic representative image, and providing the surface of the recording medium with said at least one synthetic representative image, wherein said plurality of areas are arranged in the order of date on which said plurality of representative images are obtained.

4. A representative image providing method of providing the surface of a recording medium on which a plurality of pieces of image data are recorded with representative images respectively representing the pieces of image data recorded on the recording medium, wherein the improvement comprising steps of carrying out a lenticular image synthesis, where each of said plurality of representative images is divided into a plurality of strip-like areas, and the divided areas are arranged in a predetermined order, on said representative images to generate at least one synthetic representative image, and providing the surface of the recording medium with said at least one synthetic representative image, wherein when data is recorded on the recording medium in slide show format where images selected from a plurality of pieces of image data are displayed in sequence, said plurality of areas are arranged in the order in which the data is to be reproduced.

5. A non-transitory recording medium having stored thereon computer executable code for causing a computer to execute a method of providing the surface of a recording medium on which a plurality of pieces of image data are recorded with representative images respectively representing the pieces of image data recorded on the recording medium, the computer executable code causing a computer to:

carry out a lenticular image synthesis, where each of said plurality of representative images is divided into a plurality of strip-like areas, and the divided areas are arranged in a predetermined order, on said representative images to generate at least one synthetic representative image, and provide the surface of the recording medium with said at least one synthetic representative image, wherein said plurality of areas are arranged in the order of date on which said plurality of representative images are obtained.

6. A non-transitory recording medium having stored thereon computer executable code for causing a computer, to execute a method of providing the surface of a recording medium on which a plurality of pieces of image data are recorded with representative images respectively representing the pieces of image data recorded on the recording medium, the computer executable code causing a computer to:

carry out a lenticular image synthesis, where each of said plurality of representative images is divided into a plurality of strip-like areas, and the divided areas are arranged in a predetermined order, on said representative images to generate at least one synthetic representative image, and provide the surface of the recording medium with said at least one synthetic representative image, wherein when data is recorded on the recording medium in slide show format where images selected from a plurality of pieces of image data are displayed in sequence, said plurality of areas are arranged in the order in which the data is to be reproduced.

* * * * *